United States Patent [19]

Chamulak et al.

[11] Patent Number: 4,993,298

[45] Date of Patent: Feb. 19, 1991

[54] APPARATUS FOR MOUNTING A NOTCHING BLADE

[75] Inventors: Steven A. Chamulak, Canton; Dennis H. Skvarce, Wixom, both of Mich.

[73] Assignee: Alpha Industries, Inc., Novi, Mich.

[21] Appl. No.: 417,035

[22] Filed: Oct. 4, 1989

[51] Int. Cl.$^5$ .......................... B23D 21/00; B26D 7/26
[52] U.S. Cl. ........................................... 83/698; 83/54; 83/319; 83/917
[58] Field of Search ................... 83/698, 699, 700, 54, 83/917, 300, 310, 319, 318, 320; 403/373, 379

[56] References Cited

U.S. PATENT DOCUMENTS

| | | | |
|---|---|---|---|
| 4,108,029 | 8/1978 | Borzym | 83/54 |
| 4,109,555 | 8/1978 | Borzym | 83/700 |
| 4,294,147 | 10/1981 | Borzym | 83/382 |
| 4,766,792 | 8/1988 | Borzym et al. | 83/319 |
| 4,796,498 | 1/1989 | Borzym | 83/49 |
| 4,872,384 | 10/1989 | Borzym | 83/698 X |

*Primary Examiner*—Hien H. Phan
*Assistant Examiner*—Eugenia A. Jones
*Attorney, Agent, or Firm*—Krass & Young

[57] ABSTRACT

Apparatus for mounting a notching blade assembly specifically for use in a double-cut die set of the type used to cut tubing continuously emanating from the tube mill. The present invention is directed toward the notching blade assembly used in conjunction with the vertical guillotine blade of the cut-off die set to notch the upper surface of the tubing prior to the shearing cut. The subject device includes a clamp plate secured to the carriage of the double-cut die set, a key-shaped transverse bore extending through the clamp plate and carriage body so that the notching blade having a corresponding key-shaped bore can be placed between the clamp plate and carriage, a locking stud having a locking pin on one end thereof is inserted through the key-shaped transverse bore and rotated away from the channel groove portion of the keyhole-shaped bore to clamp the notching blade between the clamp plate and carriage assembly.

11 Claims, 3 Drawing Sheets

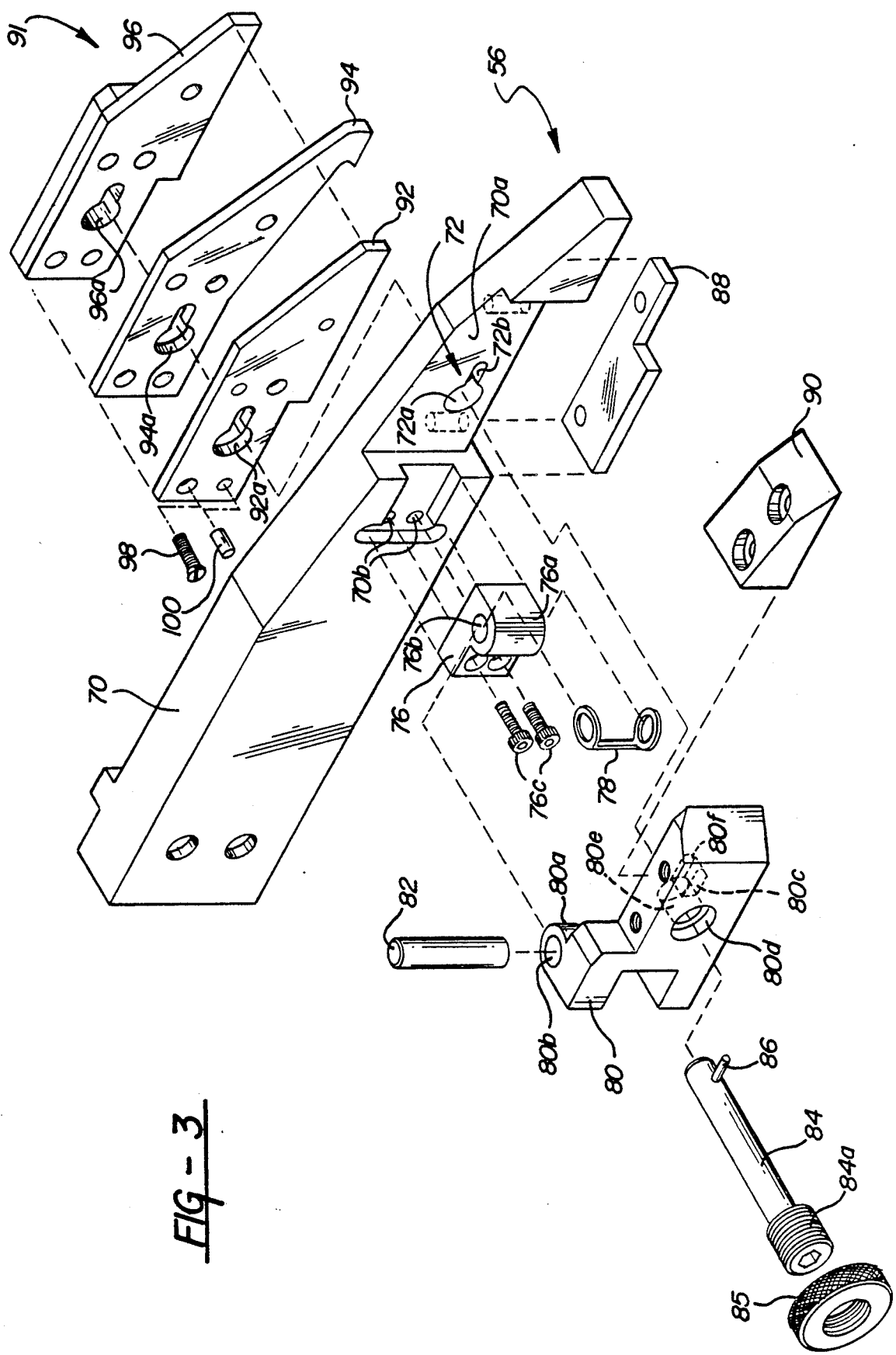

APPARATUS FOR MOUNTING A NOTCHING BLADE

INTRODUCTION

This invention relates to a double-cut die set of the type used in combination with a press to cut tubing as it is fabricated. More specifically, the present invention is directed toward improvements in mounting a notching blade to the carriage member of a cut-off die set of the double-cut type. These improvements facilitate the installation and replacement of the notching blade.

BACKGROUND OF THE INVENTION

In a cut-off die set of the double-cut type a notching blade is caused to move across and notch the upper surface of the tubing prior to the entry of a shearing blade into the upper tube wall. Prenotching the tube in this manner reduces or eliminates dimpling or collapsing of the tube wall by the shearing blade, thus eliminating the need for reshaping the ends of the tubing after the cutting operation.

The notching apparatus typically comprises a notching blade fixed or mounted to a carriage member mounted to the cross slide assembly of the cut-off die set. Cross slide assemblies are known, see U.S. Pat. No. 4,766,792. The cross slide assembly is operated by the upper platen of the die set by way of a mechanical cam and cam follower. The association is such that vertical travel of the upper platen of the die set causes the notching blade to travel through a transverse path perpendicular to the axial path of the tube. Both thrust and "pull across" motions are known. See for example U.S. Pat. Nos. 4,109,555 and 4,294,147.

The notching blade which performs the cutting operation eventually succumbs to wear and must be replaced. Presently, in order to replace notching blade, the worn blade must be unbolted from the carriage and a new blade rebolted in its place.

Time is of the essence in the tube cutting industry, tubing continuously emanates from a tube mill at a high rate of speed. Thus any problems, delays or shutdowns for repair or replacement of the cutting equipment results in lost production and revenue to the tube maker. Therefore any time savings that result from ease in maintenance and/or replacement of parts increases the period the mill can be operational, thus increasing production.

SUMMARY OF THE INVENTION

The present invention is directed to an improved means for mounting and securing a notching blade to the carriage of a cut-off die set of the double-cut tube cut-off type. According to the invention, a cross cut blade carriage has a keyhole-shaped opening extending fully through and between the front and rear faces thereof. A clamp member is placed on the front face of the carriage, the clamp member further includes a keyhole-shaped opening. A notching blade having a keyhole-shaped opening corresponding to the keyhole-shaped openings on the carriage and clamp member is placed between the clamp member and the carriage at a point aligning the axes of the keyhole-shaped openings. A locking stud, including a lock pin mounted on one end thereof, and a raised shoulder portion on the end opposite said lock pin, is inserted into the respective keyhole-shaped opening.

In the preferred form this arrangement allows the operator to place the notching blade adjacent to the carriage member and the clamping plate adjacent to the notching blade. The operator by inserting and rotating the locking stud within the respective keyhole-shaped openings, causes the lock pin to bear against the rear side of the carriage member thereby locking notching blade in the cutting position.

Another aspect of the invention includes a countersunk portion, about the keyhole-shaped opening, on the rear side of the carriage. The axis of this countersunk portion being skewed with respect to the axis of the keyhole-shaped opening.

According to a further feature, spacers are placed adjacent to the notching blade between the clamping plate or carriage member. In the preferred form these spacers allow the width of the notching blade to be varied to accommodate different tube diameters and wall thicknesses.

A further feature of the invention includes a hinged connection between the carriage and the clamping plate.

Another aspect of the invention includes the shoulder of the locking stud having a threaded portion. A locking nut is threadably engaged on the threaded portion of the locking member to further secure the locking stud from movement.

Other aspects of the invention include a rest plate mounted to the lower surface of the carriage member and a cap or top plate mounted to the upper surface of the clamping plate.

BRIEF DESCRIPTION OF THE DRAWING

FIG. 3 is an exploded perspective view of the means for mounting the notching blade in the carriage.

DETAILED DESCRIPTION OF THE PREFERRED EMBODIMENT

Figure 1:
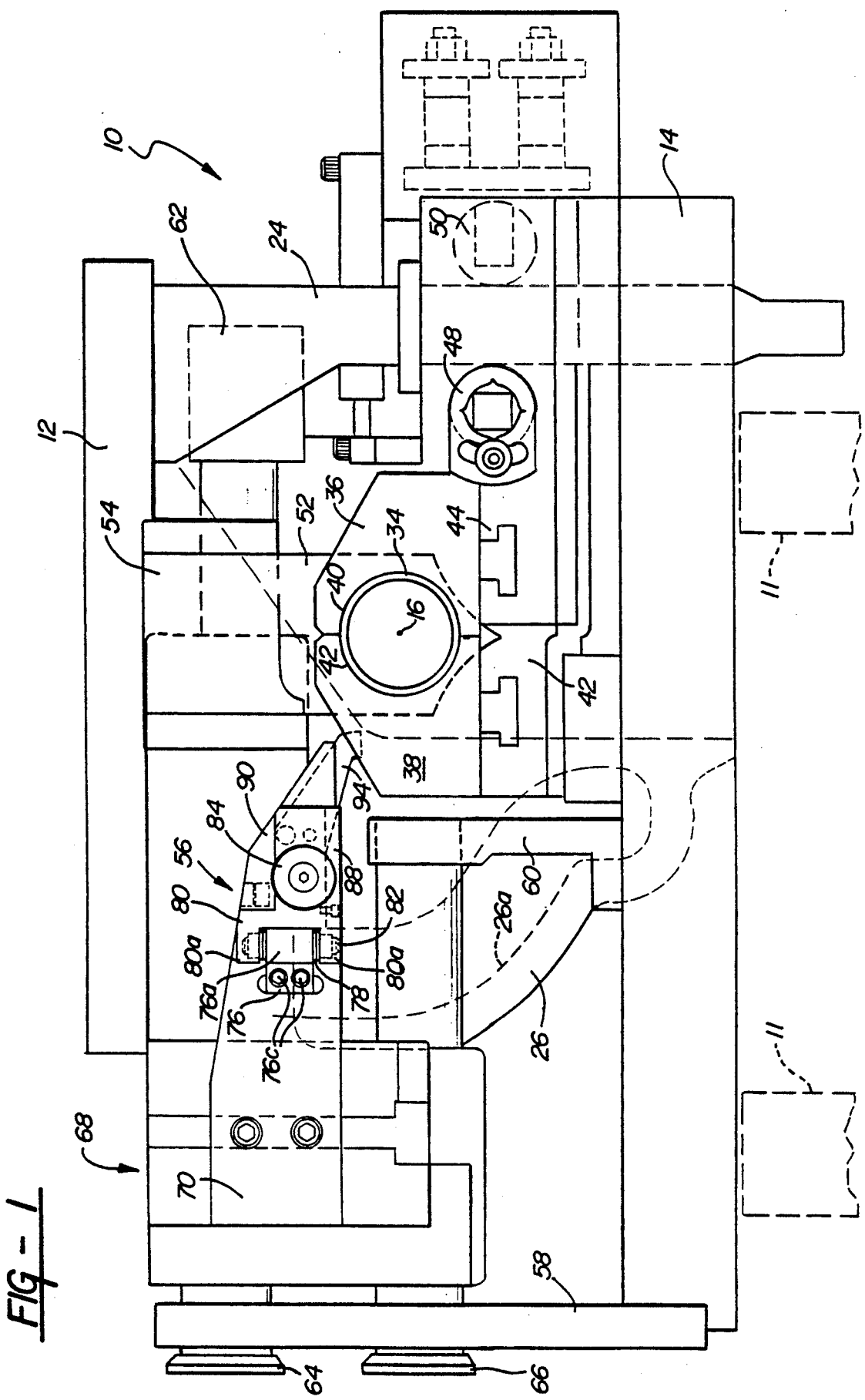
FIG. 1 is an end elevational view of a cut-off die set according to the invention.
Figure 2:
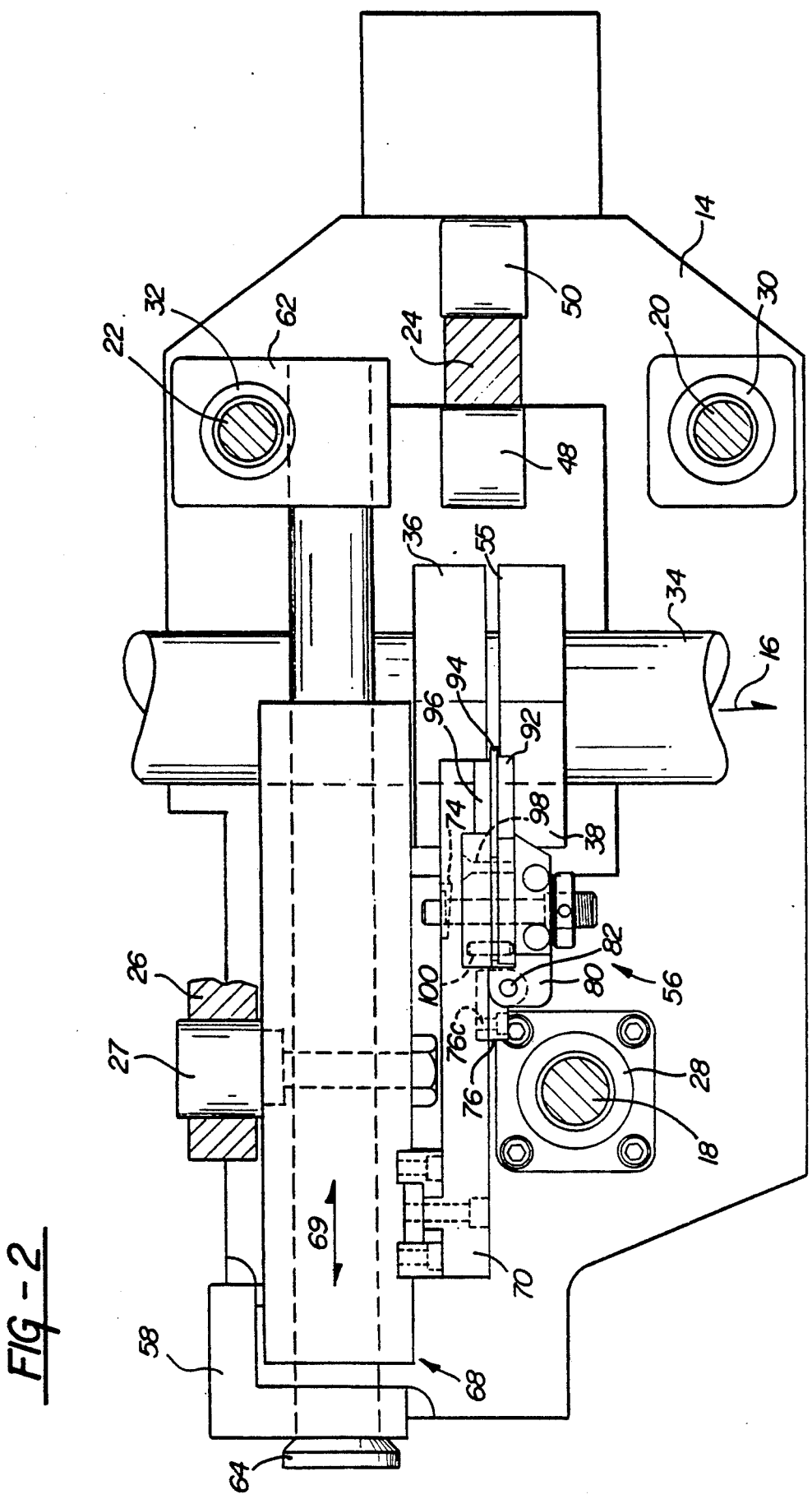
FIG. 2 is a top view of the invention cut-off die set with portions removed for clarity of illustration.

The illustrated cut-off die set 10 is adapted to be employed in a tube cutting apparatus and is slidably movable along a set of rails 11 which are part of the press base. The press includes a swinging or reciprocating ram mechanism (not shown) which bears against an upper platen 12 and serves to operate the cut-off die set 10. In die sets of the general type with which the present invention is concerned, the cut-off die set is positioned to receive the tubing as it emanates from the fabrication mill and the ram mechanism operates to cause the clamping jaws within the die set to clamp the die set to the rapidly moving tubing. The die set, clamped to the moving tube, moves together with the tube along the rails 11. The ram mechanism then causes the notching blade to make a notching cut in the upper periphery of the tubing whereafter the main cut-off blade is lowered to sever a length from the moving tube. Following the final severing cut, the ram mechanism, then operating in a reverse manner, first causes retraction of the main cut-off blade and the notching blade and then unclamping of the die set from the tube section as the cut off die set approaches the end of its travel on the rails 11. The cut-off die set is then returned to its initial position on the rails set 11 preparatory to initiation of a new cut-off cycle.

Cut-off die set 10 includes an upper platen or shoe 12 and a lower platen or shoe 14.

Upper platen 12 overlies the tube path 16 and includes three guide rods 18, 20 and 22 extending downwardly from spaced locations on the underside of platen 12. Guide rod 18 is positioned on the left-hand or near side of tube path 16 and guide rods 20 and 22 are positioned at the front and rear of the cut-off die set respectively on the right-hand or remote side of tube path 16. A die jaw cam 24 extends downwardly from upper platen 12 generally between guide rods 20 and 22 and a cam guide 26 extends downwardly from upper platen 12 adjacent the rear edge thereof and on the near or left-hand side of tube path 16.

A plurality of guide sleeves or bushings 28, 30 and 32 upstand from lower platen 14 and respectively telescopically receive the lower ends of guide rods 18, 20 and 22 so as to guide upper platen 12 in reciprocal movement relative to lower platen 14 during the tube severing operation.

The tubing 34 emanating from the tube forming mill is clamped to the die set 10 by means of two pairs of die jaws 36 and 38 each having a complementary inner radius contour 40 and 42, conforming to the tube contour. The reciprocal clamping and disengaging movement of die jaws 36 and 38 is produced by sliding movement of an upper die jaw holder 44 and a lower die jaw holder 46 slidable on each other. The die clamping jaws 36 and 38 are adapted to be reciprocated toward and away from each other in synchronism with the movement of the upper platen relative to the lower platen by coaction of die jaw cam 24 passing between a pair of clamping rollers 48 and 50 carried respectively by the upper die jaw holder 44 and lower die jaw holder 46. The manner in which the cam 24 coacts with the rollers 48 and 50 to move the die jaws 36 and 38 into and out of clamping engagement with tube 34 will not be further described since this mechanism is known and is not part of the present invention. Further details of a mechanism of this type may be found in U.S. Pat. Nos. 4,108,029 and 4,294,147, both assigned to the assignee of the subject application.

A shearing blade 52 is mounted in a blade holder assembly 54 which in turn is secured to the underside and extends downwardly from upper platen 12. Die jaws 36 and 38 are spaced apart at 55 relative to the tube axis to provide a clearance space through which the blade 52 passes when the ram operating mechanism reciprocates the upper platen 12 downwardly sufficiently to pass through the plane of the tube.

A notching assembly seen generally at 56 operates to provide a notching cut in the upper periphery of the tube prior to the downward severing movement of the guillotine 52 so as to preclude the necessity of further working of the severed tube section following the severing operation.

Notching assembly 56 is supported on a cross slide assembly 68 comprising a support bracket 58, a support bracket 60, a support bracket 62, an upper guide shaft 64 and a lower guide shaft 66. A cam follower 27 is fixed to the cross slide 68 and follows cam guide 26 having a curvilinear cam track 26a. Movement of the upper platen 12 causes the cam guide 26 to impart reciprocal motion 69 to the cross slide 68. Further details of a cross slide mechanism of this type may be found in U.S. Pat. No. 4,766,792, assigned to the assignee of the subject application.

Referring to FIG. 3, the notching blade 94 is mounted to the carriage 70 which is supported by the cross-slide assembly 68 (not shown). In the preferred form the carriage 70 has a vertically extending notched portion 70a on the end of the carriage 70 closest to the tube path 16. The notched portion 70a further contains a key-shaped transverse bore 72 comprised of a generally circular bore 72a and an elongated U-shaped groove 72b adjacent to the generally circular bore 72a. The carriage 70 further a counter-sunk portion 74 which is centered about the axis of the generally circular bore 72a, the counter-sunk portion 74 being of sufficient radius to extend past the U-shaped groove 72b. The axis of the counter-sunk portion 74a is skewed with respect to the axis of the generally circular bore 72a.

A hinge member 76 having an ear portion 76a is secured to the carriage 70 by means of threaded fasteners 76c extending through the hinge member 76 and threadably engaging the carriage 70 at threaded holes 70b. The ear portion of the hinge member 76a further has a transverse bore 76b. A clamp plate 80 having ear portions 80a containing bores 80b in said ear portions 80a is placed adjacent to the hinge member 76 with so that the ear portion 76a of the hinge member 76 is adjacent to the ear portions 80a of the clamp plate 80. A spring 78 is placed adjacent to the ear 76a of the hinge plate 76. A hinge pin 82 is then placed in transverse bores 80b and 76b to rotatably couple the clamp plate 80 and hinge member 76.

The clamp plate 80 includes a key-shaped transverse bore 80c having a countersunk portion 80d. While the generally circular portion 80e of the keyhole-shaped transverse bore extends through the clamp plate 80, the elongated U-shaped groove portion 80f is of sufficient depth to allow the end of the locking stud 84 to be fully recessed within the clamp plate 80 when withdrawn.

The locking stud 84 is a generally circular elongated member. A lock pin 86 is inserted on one end of the locking stud 84 and a generally elongated shoulder portion 84a is located at the opposite end. In the preferred form the elongated locking stud 84 is placed in the generally circular transverse bore 80c, the lock pin 86 is then inserted in the locking stud 84. The countersunk portion 80d of the clamp plate 80 is comparable in diameter to the shoulder portion 84a of the locking stud 84. This combination retains the locking stud 84 to the clamp plate 80. As explained the locking stud 84 may then be retracted so that the locking pin 86 is recessed in the key-shaped transverse bore 80c enabling the end of the locking stud 84 to lie flush with or within the inner surface clamp member 80.

A rest plate 88 is fastened to the undersurface of the carriage 70 using threadable fasteners, obviously other fastening means could be used or the rest plate 88 could be an integral portion of carriage member 70. The notching blade assembly is generally comprised of a door side spacer 92, a notching blade 94, and a carriage side spacer 96. The respective width and sizes of the spacers and notching blades will vary depending upon the size and thickness diameter of the tubing that is to be cut. The spacers 92,96 and blade 94 all have keyhole-shaped transverse bores extending through each, 92a, 94a and 96a, respectively. The two spacers and blade are held in combination by a series of threaded fasteners 98 and pins 100.

To secure the notching blade assembly 91 to the carriage 70 the operator must pull the locking stud 84 outward until the locking pin 86 is recessed in the keyhole-shaped transverse bore 80c of the clamp plate 80. Once the locking stud 84 is clear of the carriage 70, the clamp plate 80 may be opened outward from the carriage 70 using the hinged portion 76. The operator then positions the notching blade assembly 91 by aligning the corresponding keyhole-shaped openings, a task made simple by using the rest plate 88. After alignment the locking stud 84 is inserted through the key-shaped transverse bore of notching blade assembly 91 and the key-shaped transverse bore 72 of the carriage 70. The locking stud 84 is then rotated until the locking pin 86 comes into contact with the countersunk portion 74. The rotation of the locking stud on the countersunk portion 74 brings the shoulder portion 84 of the locking stud into contact with the counter-sunk portion 80d of the clamp plate 80 thereby clamping the notching blade assembly 91 in place. The shoulder 84a of the locking stud 84 is threaded and receives locking nut 85 to additionally secure the locking stud 84 in the operative position. The door cap 90 is also mounted to the upper surface of the clamping plate 80 and extends inward to cover the upper surface of the notching blade assembly 91. The door cap 90 prevents any upward or vertical motion of the cutting of the notching blade assembly 91 during the notching operation.

Although a preferred embodiment of the invention has been illustrated and described in detail, it will be apparent that various changes may be made in the disclosed embodiment without departing from the scope or spirit of the invention. Moreover the terms "vertical" and "horizontal" are used herein in a relative sense and do not suggest any given orientation of the mechanism described when placed into actual use.

We claim:

1. An apparatus for mounting a notching blade to a carriage secured to a cross slide of a double-cut tube cut-off die set comprising:
    a carriage having front and rear faces, said carriage having a keyhole extending through and between said front and rear faces, said keyhole comprising a generally circular bore having a U-shaped groove adjacent thereto;
    a clamp member having a keyhole comprising a generally circular bore having a U-shaped groove adjacent thereto so as to correspond in shape to the keyhole in said carriage;
    a notching blade having a keyhole corresponding to the keyhole in said carriage, said notching blade being placed between said clamp member and said carriage at a point wherein the axes of the corresponding keyholes are aligned;
    a locking stud extending through said corresponding keyholes, said locking stud having a lock pin mounted at one end thereof and a shoulder portion at the opposite end, so that when the pin is placed through the clamp member, the notching blade and the carriage, the lock pin acts upon said carriage when said locking stud is rotated.

2. An apparatus for mounting a notching blade as defined in claim 1 wherein said carriage further includes a countersunk portion about the axis of said generally circular bore in the carriage which is skewed with respect to the axis of the generally circular bore in the carriage.

3. An apparatus for mounting a notching blade as defined in claim 2 wherein the clamp member plate is mounted by a hinge means to the carriage.

4. An apparatus for mounting a notching blade as defined in claim 3 wherein the U-shaped groove in the clamp member extends only partially through the clamp member and the generally circular bore in the clamp member extends fully through the clamp member.

5. An apparatus for mounting a notching blade as defined in claim 4 wherein a rest plate is mounted to a lower portion of the carriage.

6. An apparatus for mounting a notching blade as defined in claim 5 wherein a cap plate is secured to an upper surface of the clamp member so that the notching blade is retained in position during a cutting operation.

7. An apparatus for mounting a notching blade as defined in claim 6 wherein a lock nut is placed on the locking stud so that the locking stud may be secured in position.

8. An apparatus for mounting a notching blade as defined in claim 1 wherein spacer members placed adjacent to the notching blade are used between the clamp member and the carriage.

9. An apparatus for mounting a notching blade to a carriage secured to a cross slide of a double-cut tube cut-off die set comprising: a carriage having front and rear sides, said rear side being adjacent to the cross slide, said carriage further having a keyhole-shaped transverse bore extending between said front and rear sides, said keyhole-shaped bore comprising a generally circular bore having a U-shaped groove adjacent thereto, said carriage having a countersunk portion on the rear side about the axis of the generally circular bore;
    a hinge plate mounted to the front side of said carriage, said hinge plate including an ear portion having a bore thereon;
    a clamping plate comprising an inwardly projecting ear portion having a bore therein, said clamping plate further having a counter-sunk portion on the side opposite said carriage about the axis of the generally circular bore; a hinge pin connecting the respective ear portions of the clamping plate and the hinge plate;
    a notching blade having a keyhole-shaped transverse bore placed between said carriage and said clamping plate;
    a spacer plate having a keyhole-shaped transverse bore placed adjacent to said notching blade;
    a rest plate secured to a bottom surface of said carriage for supporting the notching blade;
    a locking stud having a shoulder portion at one end thereof;
    a lock pin secured in the locking stud in the end opposite said shoulder portion, so that the locking stud may be placed in the keyhole-shaped transverse bore extending through the carriage, the spacer plate, and the notching blade, so that the shoulder portion bears on the counter-sunk portion of the clamping plate and the lock pin when rotated bears upon the counter-sunk portion of the carriage.

10. An apparatus for mounting a notching blade as defined in claim 9 wherein the counter-sunk portion of the carriage is skewed with respect to the axis of the generally circular bore.

11. An apparatus for mounting a notching blade as defined in claim 10 wherein a lock nut is placed on the shoulder portion of the locking stud so that when the lock nut is tightened it bears upon the clamping plate to prevent the locking stud from loosening.

* * * * *